(12) United States Patent
Pan et al.

(10) Patent No.: US 9,975,085 B2
(45) Date of Patent: May 22, 2018

(54) CONTAINER-TYPE BIOGAS PURIFICATION FILM METHOD PURIFICATION SYSTEM

(71) Applicant: BEIJING HELEE BIO-ENERGY LTD., Yanqing District, Beijing (CN)

(72) Inventors: Wenzhi Pan, Beijing (CN); Changqing Zhou, Beijing (CN); Xinghua Yang, Beijing (CN); Hongyan Li, Beijing (CN); Dawei Wang, Beijing (CN); Wenjin Li, Beijing (CN)

(73) Assignee: BEIJING HELEE BIO-ENERGY LTD. (CN)

( * ) Notice: Subject to any disclaimer, the term of this patent is extended or adjusted under 35 U.S.C. 154(b) by 0 days. days.

(21) Appl. No.: 14/392,164

(22) PCT Filed: Jun. 20, 2014

(86) PCT No.: PCT/CN2014/080417
§ 371 (c)(1),
(2) Date: Dec. 23, 2015

(87) PCT Pub. No.: WO2014/206248
PCT Pub. Date: Dec. 31, 2014

(65) Prior Publication Data
US 2016/0166980 A1 Jun. 16, 2016

(30) Foreign Application Priority Data
Jun. 24, 2013 (CN) .......................... 2013 2 0365062

(51) Int. Cl.
*B01D 53/02* (2006.01)
*B01D 53/22* (2006.01)
(Continued)

(52) U.S. Cl.
CPC ......... *B01D 53/229* (2013.01); *B01D 46/003* (2013.01); *B01D 51/10* (2013.01);
(Continued)

(58) Field of Classification Search
CPC ........ B01D 2053/224; B01D 2253/102; B01D 2256/245; B01D 2257/30;
(Continued)

(56) References Cited

U.S. PATENT DOCUMENTS

2009/0239279 A1\* 9/2009 Hall .......................... C10G 2/32
435/167
2010/0107872 A1\* 5/2010 Bethell .................. B01D 53/04
95/92

(Continued)

FOREIGN PATENT DOCUMENTS

CN 101028579 A \* 9/2007 ............ C12M 47/18
CN 102533369 A 7/2012
(Continued)

OTHER PUBLICATIONS

Translation of CN 101028579 A, Sep. 2007, Zhang.\*

*Primary Examiner* — Christopher P Jones
(74) *Attorney, Agent, or Firm* — Morriss O'Bryant Compagni Cannon, PLLC

(57) ABSTRACT

A container-type biogas purification film method purification system comprises: a desulfurization and dehydration unit, a compressor, a purification unit, a heat exchanger, and a film-group purification and gas preparation unit that are disposed inside a movable container and are sequentially connected, the desulfurization and dehydration unit is connected to a biogas source generated by an anaerobic fermentation.

11 Claims, 1 Drawing Sheet

(51) Int. Cl.
  *C10L 3/08* (2006.01)
  *C10L 3/10* (2006.01)
  *B01D 46/00* (2006.01)
  *B01D 51/10* (2006.01)
  *B01D 53/04* (2006.01)
  *B01D 53/26* (2006.01)

(52) U.S. Cl.
  CPC ......... *B01D 53/0415* (2013.01); *B01D 53/22* (2013.01); *B01D 53/265* (2013.01); *C10L 3/08* (2013.01); *C10L 3/102* (2013.01); *B01D 2053/224* (2013.01); *B01D 2253/102* (2013.01); *B01D 2256/245* (2013.01); *B01D 2257/30* (2013.01); *B01D 2257/504* (2013.01); *B01D 2257/80* (2013.01); *B01D 2258/05* (2013.01); *C10L 3/106* (2013.01); *Y02C 10/10* (2013.01); *Y02E 50/343* (2013.01)

(58) Field of Classification Search
  CPC .......... B01D 2257/504; B01D 2257/80; B01D 2258/05; B01D 46/003; B01D 51/10; B01D 53/0415; B01D 53/22; B01D 53/229; B01D 53/265; C10L 3/08; C10L 3/102; C10L 3/106; Y02C 10/10; Y02E 50/343
  See application file for complete search history.

(56) References Cited

U.S. PATENT DOCUMENTS

2013/0019633 A1* 1/2013 Pierce ................. B01D 53/002 62/618
2014/0144195 A1* 5/2014 Callendrello ....... C05F 17/0018 71/10

FOREIGN PATENT DOCUMENTS

| CN | 102559316 A | 7/2012 |
| CN | 202460429 U | 10/2012 |
| CN | 103232871 A | 8/2013 |
| CN | 203342628 U | 12/2013 |

\* cited by examiner

CONTAINER-TYPE BIOGAS PURIFICATION FILM METHOD PURIFICATION SYSTEM

CROSS-REFERENCE TO RELATED APPLICATIONS

This application is a national phase entry under 35 U.S.C. § 371 of PCT/CN2014/080417 filed on Jun. 20, 2014, which claims priority to Chinese Patent Application No. 201320365062.3 filed on Jun. 24, 2013, the entirety of each of which is incorporated by this reference.

TECHNICAL FIELD

The present invention relates to biogas treatment technology, in particular, relates to a container-type biogas purification film purification system.

BACKGROUND

Biogas is a combustible gas generated by fermenting organic matters by microorganisms under anaerobic conditions. Such gas is called biogas, since it is firstly discovered in the swamp. Various organic matters, such as human and animal dung, crop straw, sewage and the like, are fermented under anaerobic conditions in a closed methane fermentation device, decomposed and transformed to produce biogas by a wide variety of biogas fermentation microorganisms. Biogas is a mixture of various gases, generally containing 50%-70% of methane, 20%-40% of carbon dioxide, and small amounts of water vapor, nitrogen, hydrogen and hydrogen sulfide etc. as the remainder. The biogas can be decontaminated by removing contaminating gases and by purified by removing carbon dioxide, and the resulting product gas can meet the national standard of natural gas for vehicle.

According to GB18047-2000 for Compressed Natural Gas (CNG) as Vehicle Fuel, the content of carbon dioxide in CNG should be less than or equal to 3.0%. Carbon dioxide is a non-combustible component in biogas, too high content will reduce the heat of combustion of natural gas, and the removal of carbon dioxide from biogas is called biogas purification.

Currently, the practically applied methods for purification of biogas are mainly divided into the following categories:

Physical method: such as pressure swing adsorption method, pressure water washing method, a polymer film separation method and the like;

Chemical method: such as Benfield method, complex catalytic method, steric hindrance amine method, BV potash lye method, ammonia water method and the like;

Physical-chemical method: such as sulfolane-ethanolamine method, MDEA method and the like.

The working principle of the chemical method is to use a chemical agent to absorb the carbon dioxide from biogas, the cost of which is higher due to the need for a large amount of chemical agents.

Three physical methods for biogas purification are mostly applied in the current field of biogas purification.

The working principle of the pressure swing adsorption method is to use the principle of difference in the adsorption property of each component in biogas on the adsorbent and change of adsorption quantity over pressure, to achieve gas separation by cyclical pressure change. In order to ensure continuous gas treatment requirements, the pressure swing adsorption method requires at least two adsorption towers, three towers, four towers or more.

The working principle of the pressure water washing method is to use water to absorb $CO_2$ in raw biogas under pressure. According to the theory of Henry's Law, solubility of gas in the water is directly proportional to the pressure in the same temperature. High-pressure and low temperature are used when water is used to absorb $CO_2$, and low-pressure or high temperature is used when desorbing the gas.

The working principle of the film separation method is that in the presence of driving force formed by the partial pressure of each gases at high-pressure side (feed side) and the low pressure side (permeate side) of polymer film-polyimide hollow fiber filament tube, viz. partial pressure difference, gases with greater solubility coefficient and diffusion coefficient (such as $CO_2$, $H_2S$) preferentially permeate through the tube wall, the remaining gas ($CH_4$) is relatively blocked, so as to achieve the purpose of separation.

The pressure swing adsorption method and the pressure water washing method both have shortcomings such as large space occupation, immovability, and complex process. High-pressure water washing operation has shortcomings such as high cost, high pressure, low temperature, great technical difficulties and easy blockage of absorption tower.

Biogas after desulfurization, cleaning and crude dehydration may be purified by using the pressure swing adsorption method. Specifically, the biogas is compressed first before entering into the refrigeration dryer to dehydrate; and then the compressed biogas enters into the pressure swing adsorption device consisting of two adsorption towers, wherein, impurity gas components such as $O_2$, $CO_2$ are selectively absorbed by the use of special carbon molecular sieve adsorbents loaded in the two adsorption towers, and at last, methane is discharged from the top of the tower.

Biogas after desulfurization, cleaning and crude dehydration may be purified by using pressure water washing method. Specifically, the biogas is compressed in a biogas compressor, and transported into the lower part of the absorption tower, and the $CO_2$ gas is absorbed by heat and mass transfer through countercurrent contact of the biogas with the cooling water spraying down from the upper part of the absorption tower. Part of the outlet gas from the absorption tower returns to a tertiary desorption tower, the other part of the outlet gas is transferred into the molecular sieve adsorbent to remove residual moisture and trace gas $CO_2$ residue in the biogas, so as to obtain qualified product gas.

Biogas after desulfurization, cleaning and crude dehydration may be purified by using the film separation method. Specifically, the biogas is compressed firstly, the compressed gas then enters into refrigeration dryer for dehydration, after purification through a filter to finely remove dust and oil, the purified biogas after heat exchanger enters into the film group for purification.

The maintenance cost for purification of biogas by the pressure swing adsorption method is high because the molecular sieve and valves need to be replaced regularly. The pressure water washing method requires a large amount of recycled water for $CO_2$ absorption, the required control instrumentation valves also need to be replaced regularly, and therefore the maintenance cost is high. A large adsorption tower (absorber) is required to be built for both the pressure swing adsorption method and the pressure water washing method, and the tower has the shortcomings such as large space occupation, immovability and complex process.

SUMMARY OF THE INVENTION (i) Technical Problem to be Solved

The purpose of the present invention is to provide a container-type biogas purification film method purification system, in order to overcome the defects of the traditional biogas purification methods such as pressure swing adsorption method and pressure water washing method, e.g. large area occupation, high investment, high energy consumption, high operating costs, and thus achieve advantages such as no discharge of pollutants and wastewater etc., high efficiency and environment protection, good movability, and good flexibility etc.

(ii) Technical Solution

To solve the above problems, the present invention provides a container-type biogas purification film method purification system, comprising: a desulfurization and dehydration unit, a compressor, a purification unit, a heat exchanger, and a film-group purification and gas preparation unit, which are disposed inside a movable container and are sequentially connected, wherein, the desulfurization and dehydration unit is connected to a biogas source generated by an anaerobic fermentation tank.

Wherein said purification unit comprises intercept pre-filter, freeze dryer, coalescing filter, activated carbon canister, primary oil-water separation filter and precision terminal filter, which are sequentially connected, wherein, the intercept pre-filter is connected to the compressor, and the precision terminal filter is connected to the heat exchanger.

Wherein the compressor is oil-free compressor.

Wherein the heat exchanger is made of stainless steel material, and is provided thereon with an automatic constant temperature control module with a controlled temperature ranging from 25° C. to 40° C.

Wherein the film-group purification and gas preparation unit comprises at least two-stage film components connected in sequence, each stage of the film components has a plurality of films arranged in parallel.

Wherein the film-group purification and gas preparation unit further comprises:

gas-distributing pipeline, both ends of which are respectively connected to the inlets of the heat exchanger and film component, and through which the gas discharged from the heat exchanger is evenly distributed to each of the film components;

gas-collecting pipeline, which is connected to the outlet of the film component to collect the product of methane gas produced from each of the film components for treatment;

exhaust pipeline, which is connected to the film component;

permeate gas reflux pipeline, both ends of which are respectively connected to the film component and the compressor.

Wherein the gas-distributing pipeline is provided with a separate stainless steel ball valve at the inlet of each of the film components.

(iii) Advantageous Effects

The container-type biogas purification film method purification system provided by the above-mentioned technical solutions, has a short technological process, saves floor space, and can be miniaturized and mobilized by integrating the purification equipment in the container; the system has low investment and low energy consumption by using polymer films to separate carbon dioxide from methane for biogas purification; the quality of the purified gas can be ensured by purifying the biogas to remove impurities before its entering into the film purification.

DETAILED DESCRIPTION OF THE INVENTION

The specific embodiments of the present invention will be described further in detail in conjunction with the accompanying drawings and examples. The following examples are intended to illustrate the invention but are not intended to limit the scope of the invention.

Figure 1:
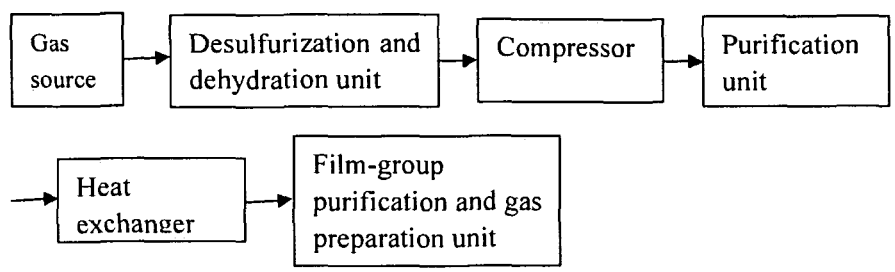
FIG. 1 is the structural schematic diagram of the container-type biogas purification film method purification system of an embodiment according to the present invention.
Figure 2:
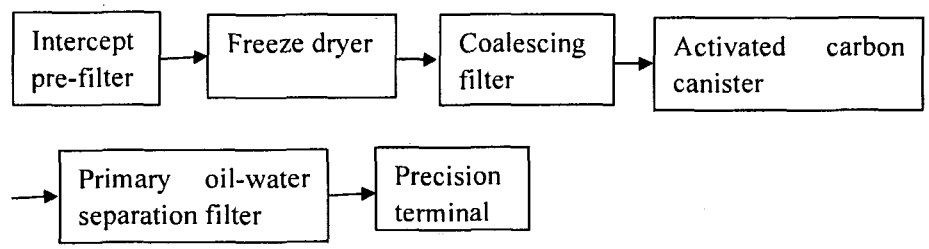
FIG. 2 is the structural schematic diagram of the purification unit of a embodiment according to the present invention.

Referring to FIG. 1 and FIG. 2, the container-type biogas purification film method purification system of the present example comprises a desulfurization and dehydration unit, a compressor, a purification unit, a heat exchanger, and a film-group purification and gas preparation unit that are disposed inside a movable container and are sequentially connected, wherein, the desulfurization and dehydration unit is connected to a biogas source generated by an anaerobic fermentation tank.

The biogas source from the anaerobic fermentation tank, usually has a pressure between 1.6 and 2.0 KPa, and biogas feed gas for mesophilic fermentation has a temperature of about 38° C.; in the feed gas components, $CH_4$ is in the range of 55%-65%, $CO_2$ is in the range of 35-40%, the concentration of $H_2S$ varies over the different materials with the range from several hundred to several thousand ppm, $O_2$ is <0.5%, $N_2$ is <3%, ammonia and carbon monoxide are in the trace amount.

In the product gas obtained by the film purification method, $CH_4$ is >95%, $CO_2$ is <3%, $H_2S$ is <10 ppm, and $O_2$ is <0.5%.

The biogas which is desulfurized and dehydrated by dehydrationon and dehydration unit is compressed by an oil-free compressor and then goes through the purification unit such as filter, freeze dryer, activated carbon canister degreaser to remove saturated water vapor, dust particles and oil content, etc.

The purification unit includes, in order, intercept pre-filter, freeze dryer, coalescing filters, activated carbon canister, primary oil-water separation filter and precision terminal filter.

The interceptor filter has a filtration accuracy of 3 μm, gas source flows from outside to inside the filter, and the filter is resistant to a pressure of 34 bar. Compressed gas is preliminarily filtered to intercept dust particles and filter out plenty of fluids. The filtration efficiency is greater than 92%.

The Freeze dryer can achieve the purpose of frozenly removing moisture by cooling the compressed biogas to a certain dew point temperature with a refrigeration equipment to separate out corresponding water contained in the biogas, based on the principle of air freeze water separating, performing gas-liquid separation through separator, and then discharging water through automatic drain valve.

The coalescing filter further filters the compressed gas with a filtration precision of 0.5 μm, the gas source flows from inside to outside the filter, to remove oil and water, the filtration efficiency is 99.925%, and the filter is resistant to a pressure of 34 bar.

The activated carbon tank containing activated carbon particles is used to deeply remove the odor, such as ammonia gas and oil in the compressed biogas, the design pressure in the tank is 1.6 MPa.

The primary oil-water separation filter has a filtration accuracy of 1 μm, the gas source flows from inside to outside the filter to remove dust particles after activated carbon adsorption.

The precision terminal filter has a filter accuracy of 0.01 μm, the gas source flows from inside to outside the filter to precisely remove dust particles and oil from the compressed biogas.

The filters are all equipped with differential pressure indicator which may indicate the best time to replace the filter element, improve the filter efficiency, reduce the pressure drop; the filters are also equipped with an automatic sewage device which can reliably drain accumulated debris.

The purified biogas enters into the heat exchanger for temperature regulation, in order to achieve the temperature requirements between 25° C.-40° C. prior to entering into the film. The heat exchanger is made of 316 stainless steel, and equipped with automatic temperature controller, and the temperature is controlled in the range of: 25-40° C. (temperature control accuracy may be up to ±1° C.), the compressed biogas bypass flow is controlled and the gas temperature is obtained by a temperature sensor by PLC, by automatic or manual controlling the regulating valve opening and closing size to achieve the desired control of the flow of heat exchange gas to control the temperature of the compressed biogas after heating.

The biogas after purification and heat exchange enters into the film-group purification and gas preparation unit for carrying out the separation of carbon dioxide and methane. The film-group purification system has a frame mounting structure with a compact connection and small space occupation.

The film-group purification and gas preparation unit is divided into four kinds of pipelines, the first one is air-distributing pipeline, both ends of which are respectively connected to the inlet of the heat exchanger and the film component to evenly distribute the compressed gas to each of the film components, so that each of the film components is in the same working state to ensure the efficiency of the film components, and the air-distributing pipeline is equipped with separate stainless steel ball valves at the entrance to each film component, when large gas production is not required, a certain number of valves can be turned off, thereby closing the corresponding film components to avoid unnecessary waste and extend the lifetime of the film component. The second one is gas-collecting pipeline, which is connected to the outlet of the film component to collect the product of methane gas produced from each of the film components for treatment, thus making transport of the product gas conveniently. The third one is exhaust pipeline, which is connected to the film components, and through which $CO_2$ can be collectively recycled or emitted due to high $CO_2$ concentration in the exhaust pipeline. The last one is permeation gas reflux pipeline, both ends of which are respectively connected to the film components and the compressor. Because permeation gas contains about 49% of $CH_4$, so it flows back to the compressor for second treatment after being pooled.

Online biogas analyzer is used to monitor the $CO_2$ content in the purified gas to control the output of product gas. Online biogas analyzer can continuously detect the content of $CH_4$, $CO_2$, $O_2$ and the like, $H_2S$ is intermittently measured. Each pipeline gas has independent 4-20 mA signal output.

A control unit is also provided in the present example, which is composed of programmable logic controller, analog module, touch screen, pressure transmitter, temperature transmitter and electric shut-off valves and the like. The control unit adopts automatic control mode to control the normal operation of the complete set of equipment, and real-time displays the operating status of the parameters such as the unit, gas pressure, temperature, flow, purity and the like. At the same time, it is possible to intensively set the film inlet temperature protection values and carbon dioxide purity protection values, control start and stop of freeze dryer, detect the operation and fault signals of the freeze dryer, reserve RS485 and RJ45 communication interfaces which can be connected to a remote monitoring center group network.

When the freeze dryer selects remote control, unit control unit can complete interlocking protection and control tasks, to achieve the control of start and stop of the freeze dryer, and detect of operation and fault status of the freeze dryer.

Compressed gas over-temperature protection control may be performed by detecting the compressed gas temperature by the temperature transmitter on the film inlet pipeline, wherein, when the temperature exceeds the set protection value, the electric three-way shut-off valve stops gas supply to the film, and meanwhile switches to bypass reflux pipelines, thus avoiding failure of the film due to aging at a high temperature.

Carbon dioxide excessive purity protection control may be performed by a purity analyzer on the film group outlet pipeline detecting the carbon dioxide content of the product gas, wherein, when the purity of carbon dioxide is greater than the set protection value, the opening of electric proportional regulating valve is reduced to increase the separation of carbon dioxide by film group to obtain the qualified product gas; when the purity of carbon dioxide is within the set range, the gas is sent to the rear end of the storage tank.

With respect to touch screen display and parameter function setting, the gas temperature, pressure, purity, operation status of the freeze drier are integrally display, and the film inlet temperature value and carbon dioxide purity protection value may also be set on the touch screen to achieve the alarm information query functions etc.

With respect to communication function, integrated RS485 communication interfaces and Ethernet communication module of CPU224CN controller, which are ontology-integrated, can be configured separately to MODBUS and Ethernet communication mode, and can be connected to the network of the centralized monitoring system, and the unit control, parameters setting, monitoring, data acquisition record and report management can achieved by a centralized control unit in a remote computer.

It is revealed by experiments that the gas purified by the film purification method, in which methane content is more than 95%, carbon dioxide is less than 3%, and hydrogen sulfide is less than 10 ppm in, meets the requirements of the national natural gas for vehicle fuel, and no pollutants are generated. As compared to the pressure swing adsorption method and the pressure water washing method, for the same 13000 $Nm^3/d$ raw biogas purification project, the film method has a significant reduction in space occupation and energy consumption. The entire film method purification system only has a freeze dryer with a power of 6 kw for removing moisture. On the contrary, the pressure water washing process requires pumps, cold water circulating pump and circulating pump for pumping circulating water, with a total power of about 63.5 kw.

The film method purification container has an area of only about 10 m², and the entire project for compressing and purifying the biogas by film purification method occupies a total floor space of approximately 500 m². In contrast, the entire pressure water washing project has a floor space of approximately 1630 m².

The above embodiments were implemented using biogas film method purification method in December 2012, in DeQingYuan ecological park, Zhang Shan Ying Town, Yanqing County, Beijing. This is a first case using the film method purification system to prepare the biogas. The entire purification system is placed in a special container with 4 meters long, 2 meters wide, and 2 meters high.

The biogas feed gas of 13000 Nm³/d was desulfurized and dehydrated before entering into the compression purification system. After desulfurization, the content hydrogen sulfide in the desulfurized biogas feed gas was reduced to below 10 ppm. Compression process was required for the purified biogas to meet the compression requirements for the film-group separation, the pressure was 1.2 MPa. The compressed biogas entered into the biogas purification container.

The biogas was purified to remove oil, water and dust before entering into the film group to carry out the separation of carbon dioxide and methane. These impurities were removed using a filter, freeze dryer and activated carbon canister. Oil and dust levels reached 0.01 ppm after purification, and no liquid water was left. Before entering the film group, the temperature of the purified biogas was made to reach between 25° C.-40° C. by heat exchange before the biogas entered into the film group for purification. Product gas after purification had a methane content of greater than 95%, carbon dioxide content of less than 3 percent, hydrogen sulfide content of less than 10 ppm, and met the national requirements of compressed natural gas for vehicle.

As can be seen from the above examples, as compared to pressure swing adsorption and pressure water washing technology, the film purification technology has obvious advantages. The purification system according to the present application has compact equipment structure and occupies smaller floor space than those of pressure swing adsorption and pressure water washing method since it can be integrated in the container; the purification system according to the present application is easy to be installed since both production and assembly of the system are completed in the factory, on-site installation work is less, and what is needed is just to complete the connection of interface pipelines and external electricity; the purification system according to the present application can be moved integrally since the functional components are integrated into an overall base; the present film purification system also has advantages such as short process, simple equipment maintenance, low investment and operating costs.

INDUSTRIAL APPLICABILITY

The present invention provides a container-type biogas purification film method purification system comprising: a desulfurization and dehydration unit, a compressor, a purification unit, a heat exchanger, and a film-group purification and gas preparation unit, which are disposed inside a movable container and are sequentially connected, wherein the desulfurization and dehydration unit is connected to a biogas source generated by an anaerobic fermentation tank. The container-type biogas purification film method purification system according to the present application is able to integrate the purification equipments in a container, has a short process, saves floor space, can be miniaturized and can be mobilized. The purification system according to the present application needs low investment and low energy consumption since the biogas is purified by using polymer film to separate carbon dioxide from methane; the quality of the gas obtained by purification can be ensured since the biogas is firstly purified to remove impurities before film purification.

What is claimed is:

1. A container-type biogas purification film method purification system, comprising:
a readily mobile container having disposed therein:
a desulfurization and dehydration unit connected in series to a compressor with a first pipeline extending between and interconnecting the desulfurization and dehydration unit to the compressor, the compressor connected in series to a purification unit with a second pipeline extending between and interconnecting the compressor to the purification unit, the purification unit connected in series with a third pipeline extending between and interconnecting the purification unit to a heat exchanger, and the heat exchanger connected in series to a film-group purification and gas preparation unit with a fourth pipeline extending between and interconnecting the heat exchanger to the film-group purification and gas preparation unit;
wherein the desulfurization and dehydration unit is connected in series to the biogas source generated by an anaerobic fermentation tank with a fifth pipeline extending between and interconnecting the biogas source to the desulfurization and dehydration unit.

2. The container-type biogas purification film method purification system of claim 1, wherein the purification unit comprises an intercept pre-filter connected in series to a freeze dryer, the freeze dryer connected in series to a coalescing filter, the coalescing filter connected in series to an activated carbon canister, the activated carbon canister connected in series to a primary oil-water separation filter, the primary oil-water separation filter connected in series to a precision terminal filter, wherein the intercept pre-filter is connected in series to the compressor and the precision terminal filter is connected in series with the third pipeline to the heat exchanger.

3. The container-type biogas purification film method purification system of claim 1, wherein the compressor is an oil-free compressor.

4. The container-type biogas purification film method purification system of claim 1, wherein the heat exchanger is made of stainless steel material and is provided with an automatic constant temperature control module thereon with a temperature control range between 25-40° C.

5. The container-type biogas purification film method purification system of claim 1, wherein the film-group purification and gas preparation unit comprises at least two stage film components connected in series, each stage of the at least two stage film components having a plurality of films arranged in parallel.

6. The container-type biogas purification film method purification system of claim 5, wherein the ends of the fourth pipeline are respectively connected between inlets of the heat exchanger and the at least two stage film components, through which gas discharged from the heat exchanger is evenly distributed to each of the film components.

7. The container-type biogas purification film method purification system of claim 5, further comprising a gas-collecting pipeline, ends of which are respectively connected to an outlet of the film components to collect a product of methane gas produced from each of the at least two film components for treatment.

8. The container-type biogas purification film method purification system of claim 7, further comprising an exhaust pipeline, which is connected to the at least two film components.

9. The container-type biogas purification film method purification system of claim 8, further comprising a permeate gas reflux pipeline, ends of which are respectively connected to the at least two stage film components and the compressor.

10. The container-type biogas purification film method purification system of claim 9, wherein the gas-distributing pipeline is provided with a separate stainless steel ball valve at the inlets of each of the at least two film components.

11. The container-type biogas purification film purification system of claim 1, the further comprising an exiting biogas exiting the film-group purification and gas preparation unit, the exiting biogas comprised of >95% $CH_4$, <3% $CO_2$, <10 ppm $H_2S$ and <0.5% $O_2$.

* * * * *